(12) United States Patent
Ding et al.

(10) Patent No.: US 8,248,918 B2
(45) Date of Patent: Aug. 21, 2012

(54) ROUTING FAILOVER WITH ACCURATE MULTICAST DELIVERY

(75) Inventors: Jin Ding, San Jose, CA (US); Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 236 days.

(21) Appl. No.: 12/371,205

(22) Filed: Feb. 13, 2009

(65) Prior Publication Data

US 2009/0201806 A1 Aug. 13, 2009

Related U.S. Application Data

(60) Provisional application No. 61/028,369, filed on Feb. 13, 2008.

(51) Int. Cl.
*G01R 31/08* (2006.01)

(52) U.S. Cl. ........ 370/218; 370/224; 370/390; 370/392; 370/395.31; 709/239; 709/242; 398/17

(58) Field of Classification Search ................. None
See application file for complete search history.

(56) References Cited

U.S. PATENT DOCUMENTS

| | | | |
|---|---|---|---|
| 6,813,242 B1 * | 11/2004 | Haskin et al. | 370/218 |
| 7,099,334 B2 * | 8/2006 | Newell et al. | 370/395.3 |
| 7,342,877 B1 * | 3/2008 | Ervin et al. | 370/224 |
| 7,545,735 B1 * | 6/2009 | Shabtay et al. | 370/217 |
| 2002/0181485 A1 * | 12/2002 | Cao et al. | 370/389 |
| 2003/0223358 A1 * | 12/2003 | Rigby et al. | 370/218 |
| 2004/0109408 A1 * | 6/2004 | Mesh et al. | 370/223 |
| 2005/0013242 A1 * | 1/2005 | Chen et al. | 370/392 |
| 2005/0201273 A1 * | 9/2005 | Shimizu | 370/216 |
| 2007/0220175 A1 * | 9/2007 | Khanna et al. | 709/251 |
| 2008/0123524 A1 * | 5/2008 | Vasseur et al. | 370/390 |

* cited by examiner

*Primary Examiner* — Jeffrey M Rutkowski
(74) *Attorney, Agent, or Firm* — Brake Hughes Bellermann LLP (57) ABSTRACT

A node comprising: an ingress port configured to receive data; a plurality of egress ports configured to transmit data; a routing table configured to provide, at least part of, both a preferred routing path and a recovery routing path; a data tag engine configured to read a tag, associated with the data, that indicates the routing state of the data and, based at least in part upon the tag determine whether to use the preferred routing path or the recovery routing path for a selected path, and determine if the tag is to be modified to indicate a change in the routing status of the data; and a routing engine configured to utilize the selected path to determine the egress port from which to transmit the data.

21 Claims, 5 Drawing Sheets

400

| |
|---|
| 402 Routing State. |
| 404 Wrap Node. |

| |
|---|
| 402 Routing State. |
| 404 Wrap Node. |

ROUTING FAILOVER WITH ACCURATE MULTICAST DELIVERY

CROSS-REFERENCE TO RELATED APPLICATION

This application claims priority under 35 U.S.C. §119 to U.S. Provisional Patent Application 61/028,369, filed Feb. 13, 2008, titled "ROUTING FAILOVER WITH ACCURATE MULTICAST DELIVERY," which is incorporated herein by reference in its entirety.

TECHNICAL FIELD

This description relates to the routing of information in a network, and more specifically to the amelioration of a failure when routing information in a ring network.

BACKGROUND

Routing, in this context, is generally the process of selecting a path for data to travel within a network from a source to a destination. Typically it involves selecting a sequence of network links to be traversed as data travels from device to device within a network. In this context, a link may be a physical, virtual, or wireless connection between two or more devices. In many instances, data may pass through or be handled by multiple intermediate devices between the original source of the data and the data's final destination.

Occasionally, a network route fails or becomes broken. For example, an intermediate device may lose power, or a cable may be unplugged or cut; however, it is understood that network failures may occur for many reasons of which the above are merely a few non-limiting examples. Typically in such an instance, the network failure is eventually detected. Generally, the amelioration of the failure in the network route or path is handled by a software or firmware program. Often, the program will alert other devices within the network path of the failure and an alternate route will be selected. Typically, this software recovery technique may be quite slow, e.g. at least 100 milliseconds (ms). During that time, additional pieces of data may experience the as yet uncorrected network failure and may be lost.

Often transmitted data is characterized as uni-cast, meaning in this context that there is one source and one destination for the data. Other forms of transmitted data may be characterized as multi-cast, meaning in this context that there is one source and multiple destinations. Often a network route involving multi-cast data will involve a fork in the routing path, with a first sub-set of the destinations coupled with a first prong of the fork and a second sub-set of destinations coupled with a second prong of the fork. Typically, prior to the fork, only one copy of the data may be transmitted. However, often when the fork is reached the data may be copied into two (or more) versions and transmitted along both prongs of the fork simultaneously.

SUMMARY

A system and/or method for communicating information is disclosed, substantially as shown in and/or described in connection with at least one of the figures, as set forth more completely in the claims.

DETAILED DESCRIPTION

Figure 1A:
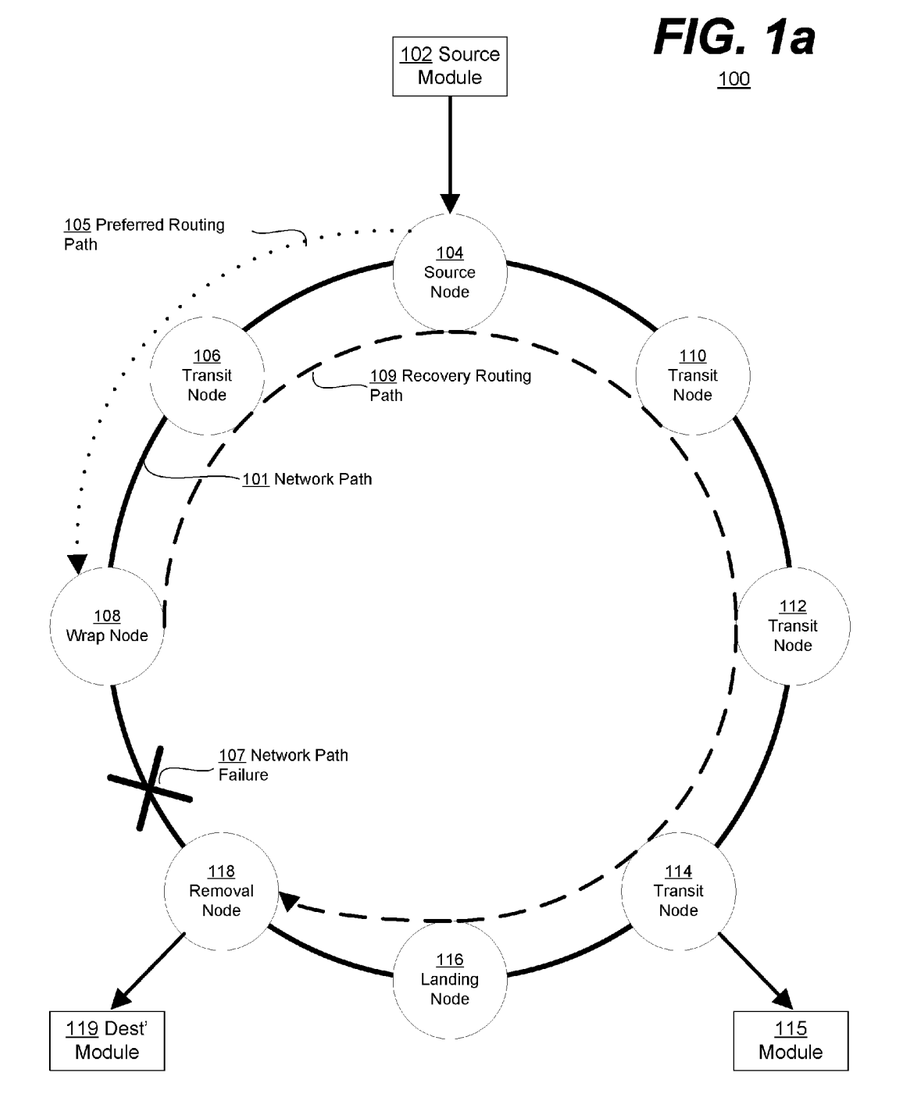
FIGS. 1a and 1b are block diagrams of systems for the routing of information in a network in accordance with the disclosed subject matter.

FIG. 1 is a block diagram of a system 100 for the routing of information in a network in accordance with the disclosed subject matter. FIG. 1a is a block diagram of a system for the routing of uni-cast information in a network in accordance with the disclosed subject matter. In one embodiment, the system 100 may include a plurality of nodes 104, 106, 108, 110, 112, 114, 116, and 118. In one embodiment, each node may include a network switch. In one embodiment, these nodes may be arranged in a ring topology. In one embodiment, this may be accomplished by coupling the network switches in series and coupling a last network switch back to the first network switch. In one embodiment, the plurality of nodes may be coupled with a plurality of modules (e.g. modules 102, 115 and 119). In one embodiment, the modules may be external to the system 100. In one embodiment, the modules may be other intermediate devices (e.g., switches) or may be terminal devices that can either stop or start the transmission of data along a network path (e.g. a computer, a telephone, etc.). In one embodiment, one of the differences between a node (e.g. node 104, 106, 108, 110, 112, 114, 116, and 118) and a module (e.g. modules 102, 115 and 119) may be that a node is internal to the system 100 whereas a module is external to the system 100. However, it is understood that in other embodiments other differences may occur.

In one embodiment, the plurality of nodes may be configured to detect a network path failure 107 between two nodes. In one embodiment, the plurality of nodes may be configured to reroute data around the network path failure 107. In one embodiment, the plurality of nodes may be configured to prevent data looping, as described above.

In one embodiment, the plurality of nodes may be configured to allow data to enter the system 100. In one embodiment, data may be transmitted from a source module 102 and sent to a destination module 119. It is understood that, in one embodiment, the source and destination may merely be intermediate points in a greater network route. In one embodiment, the data may enter the system at or via the source node 104. In one embodiment, a "source node" may be whichever node is the ingress point for a particular piece of data to the system 100. It is understood that, in one embodiment, depending upon the source module of the data, any node of system 100 may be a "source node", and that the illustrative example shown in FIG. 1 is merely one possible non-limiting embodiment of the disclosed subject matter.

In one embodiment, as the data enters the system 100 at the source node 104, a tag may be added to or associated with the data. In another embodiment, a tag may not be associated or added with the data until a network failure, as described below, is detected. In the embodiment in which a tag is associated with the data upon entering the system, the tag may indicate that the data is initially in a "normal" (vs. "jumping", or "landing", etc.) state.

In one embodiment, a "landing node" may be a node furthest away from the "source node", in a topological sense. It is understood that, in one embodiment, depending upon the source module of the data, any node of system 100 may be a "landing node", and that the illustrative example shown in FIG. 1 is merely one possible non-limiting embodiment of the disclosed subject matter. In one embodiment, a system may include an odd number of nodes, unlike system 100 which shows an even number of nodes. In such an embodiment, a source node may be associated with two landing nodes or may select a landing node from two possible landing nodes.

Figure 1B:
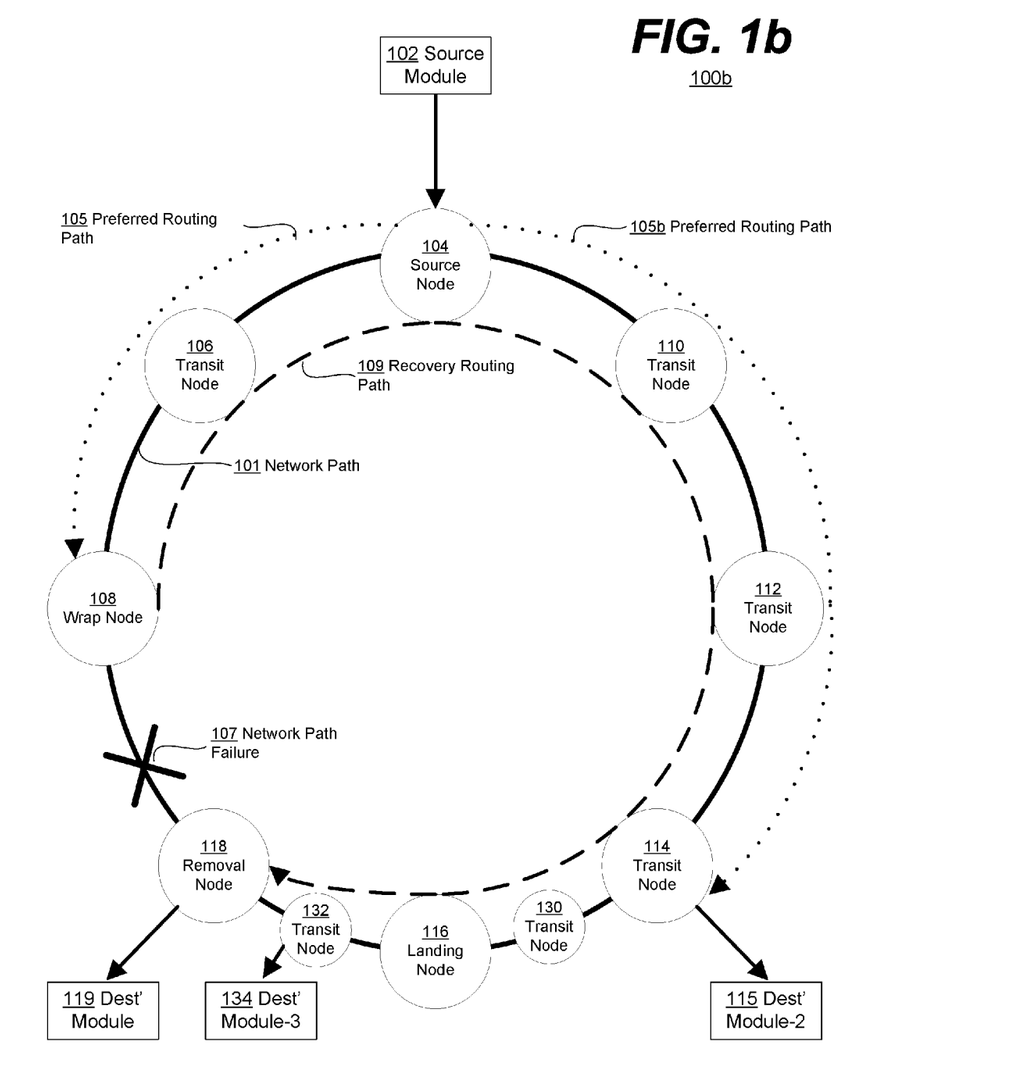

In one embodiment, a "destination node" for the data may be determined. In one embodiment, a "destination node" may be whichever node is the destination node or egress point for a particular piece of data to the system 100. This is contrasted from a "removal node" discussed below in regards to the network failure. It is understood that, in one embodiment, depending upon the destination module(s) of the data any node of system 100 may be a "destination node", and that the illustrative example shown in FIG. 1 is merely one possible non-limiting embodiment of the disclosed subject matter. In one embodiment, the data may be transmitted to a destination module 119 that is coupled with the destination node 118. In another embodiment, the data may be transmitted to the destination module 115. In such an embodiment, the node 114 may act as a destination node for that data. In one embodiment, the data may be multi-cast data; such an embodiment is discussed below in reference to FIG. 1b.

In one embodiment involving associating a tag with the data upon entering the system, the source node 104 may edit the tag to indicate that the data that is being routed through the system 100 is in a "normal" routing state. In one embodiment, a "normal" routing state may indicate that a preferred routing path is being used to transmit the data from the source node 104 to the removal node 116. In one embodiment, the preferred routing path may merely be assumed to be working, although the node may not perform any confirmation that the selected route path is actually fully working at the time of transmittal. In one embodiment, the lack of a tag that indicates a routing state may be viewed as an indication that the data being routed through the system is in a "normal" routing state. In one embodiment, the assumed working preferred routing path 105 may include nodes 104, 106, 108, and 116.

In one embodiment, the data may travel along the preferred routing path 105 until it reaches the wrap node 108. In one embodiment, the wrap node 108 may have detected a network path failure 107. In one embodiment, the network path failure 107 may include a failure in a link between two nodes, a failure in a node, or both. It is understood that many causes for a network path failure may exist and the few cited examples are not limiting on the scope of the disclosed subject matter.

In one embodiment, the wrap node 108 may be configured to create or edit the tag associated with the data to indicate that the routing state of the data is in a "jump" mode. In one embodiment, a "jump" routing state may indicate that a recovery network path 109 is selected and that no multi-cast copies of the data may be made. In one embodiment, the recovery network path 109 may include nodes 108, 106, 104, 110, 112, 114, 116, and 118. In the embodiment illustrated by FIG. 1, the data may switch from progressing in a counter-clockwise direction to progressing in a clockwise direction around the ring system 100. In one embodiment, a "wrap node" may indicate the node at which the data turned around and began travelling the opposite way around the ring system 100. In one embodiment, the term "wrap" may indicate that if the data were to ever arrive at the node a second time (e.g. if the network path failure 107 were intermittent or had been repaired) that the data would have wrapped around the ring. Examples of such a case are discussed below. It is understood that, in one embodiment, depending upon the source module of the data, destination module(s) of the data, and the network routing failure any node of system 100 may be a "wrap node", and that the illustrative example shown in FIG. 1 is merely one possible non-limiting embodiment of the disclosed subject matter.

In one embodiment, the wrap node 108 may be configured to edit the tag associated with the data to indicate that node 108 is the "wrap node" for the data. In one embodiment, the wrap node 108 may be configured to transmit the data to the destination node 118 or the destination module 119 via the recovery routing path 109.

In one embodiment, data can be received by a transit node (e.g., transit node 106). The transit node may be configured to read the tag associated with the data to determine the routing state of the data and, based at least in part upon the tag to determine whether or not to use the preferred routing path 105 or the recovery routing path 109. In one embodiment, the term "transit node" may indicate that the data is passing through a node but that the node is not a source, landing, destination, removal, or wrap node. It is understood that, in one embodiment, depending upon the source module of the data, destination module(s) of the data, and the network routing failure any node of system 100 may be a "transit node", and that the illustrative example shown in FIG. 1 is merely one possible non-limiting embodiment of the disclosed subject matter.

In one embodiment, the transit node 106 may receive the data twice. In one embodiment, the first time transit node 106 receives the data the routing state of the data may be "normal" and indicate that the preferred routing path 105 is to be used to transmit the data. In one embodiment, the second time transit node 106 receives the data the routing state of the data may be in a "jump" state and indicate that the recovery routing path 109 is to be used to transmit the data.

In one embodiment, the above rerouting of the path for the data, described in reference to the source node 104, wrap node 106 and transit node 104, may be accomplished in hardware and may occur at the speed of normal data transmission (e.g., less than 50 ms), as opposed to waiting for a route update using software that is often slow (e.g., at least 100 ms). In one embodiment, this may allow the system 100 to be configured to reduce or prevent data loss after the network failure has been detected. In one embodiment, the software based rerouting of a node's path may be relatively slow, e.g., at least 100 milliseconds (ms). Conversely, in one embodiment, the rerouting of the data's path via a hardware scheme, as described above, may occur at the speed of normal data transmission (e.g., less than 50 ms). In various embodiments, the hardware rerouting scheme may employ or be based at least partially on a routing table, a backup routing table, and the tag associated with the data.

In one embodiment, as the data travels clockwise along the recovery routing path 109, it may traverse node 104 a second time. In one embodiment, during the second traversal, node 104 may act as a transit node, described above. Continuing along the path the data may also traverse transit nodes 110, 112, and 114.

In one embodiment, the data may reach landing node 116. In one embodiment, the landing node 116 may be configured to read the tag associated with the data to determine the routing state of the data, and based at least in part upon the tag determine whether or not to use the preferred routing path 105 or the recovery routing path 109. In one embodiment, the tag may indicate that the data is in a "jump" routing state, which may indicate that a recovery routing path is to be used and that no additional copies are to be made of any multi-cast data. In one embodiment, the node 116 may be configured to determine whether or not the node is the landing node for the data.

In one embodiment, every transit node may also perform this determination. If, in one embodiment, the node 116 is the landing node for the data, the landing node 116 may modify or edit the tag to indicate that the routing state of the data is in a "landing" mode. In one embodiment, a "landing" routing state may indicate that a recovery network path 109 is selected and that multi-cast copies of the data may be made. In one embodiment, the landing node 116 may transmit the data to removal node 118.

In one embodiment, the node 118 may be configured to determine whether or not it is the destination node for the data and, if so, transmit the data to the destination module 119. In one embodiment, every transit node may also perform this determination. In one embodiment, the destination node 118 may remove the data, or at least this particular copy of the data from the system 100.

In another embodiment, the node 118 may be configured to determine whether or not it is the "removal node" for the data. In various embodiments, a "removal node" may include a node directly downstream or on the other side of the network failure 107. In some embodiments, the purpose of the removal node may be to avoid looping of the data in the ring. In such an embodiment, the removal node (e.g., removal node 118) may be configured to drop or remove data from the system 100 that would normally pass through the failed link 107, and therefore, loop or wrap back around the ring. In various embodiments, the removal node may be determined based at least partially upon the wrap node associated with the data via the tag. In various embodiments, the removal node 118 may also be referred to as the "loop avoid removal node"; although, it is understood that the above is merely one illustrative example to which the disclosed subject matter is not limited.

In one embodiment, the network path failure 107 may still exist by the time the data has reached the removal node 118. In one embodiment, the removal node 118 may be configured to detect that the data is in a non-"normal" routing state and therefore refrain from acting as a wrap node. In one embodiment, the detection of both a network path failure 107 and that the data is in a non-"normal" routing state may result in the removal node 118 removing the data from the system 100.

Conversely, in one less preferred embodiment, the removal node 118 may act as a wrap node and re-route the data back towards node 108 in a counter-clockwise direction. In one such embodiment, the data may be said to "bounce" back and forth from the wrap node 108 to the removal node 118 and back again. In one embodiment, this bouncing may be considered a form of "looping". Extra transmission or bouncing of this nature may not be desirable, in various embodiments. In one embodiment, the system 100 and the plurality of nodes may be configured to prevent bouncing of the data. In one embodiment, bouncing may be prevented by the removal of the data by the removal node 118 or, in another embodiment, by preventing the removal node 118 from acting as a wrap node for the data. In another embodiment, any node may be prevented from acting as a wrap node once a first wrap node (e.g., wrap node 108) is identified for the data.

In one other example embodiment, the system 100 may be configured to generally transmit data in a counter clockwise or clockwise direction until it reaches a landing node. In such an embodiment, the landing node (e.g., node 116) may be the furthest node from the source node (e.g., node 104) and, therefore, in reaching the landing node the data may have passed through every other node that might have been coupled with a destination module. In one embodiment, discussed in more detail in relation with FIG. 1b, the data may be copied and travel substantially simultaneously both counter clockwise and clockwise. In such an embodiment, a node may be configured to determine if the node is the landing node for the data, and if so remove the data from the system 100. In one embodiment, the landing node 116 may be configured to not remove the data from the system 100 if the routing state of the data is in a non-"normal" state or merely in a "jump" state.

In one embodiment, the network path failure 107 may be repaired by the time the data has reached the removal node 118. In such an embodiment, the removal node 118 may remove the data from the system 100. In another less preferred embodiment, the data may be removed by the wrap node 108. In various embodiments in which such removal may not occur. Such continued transmittal of the data may be referred to, in this context, as "looping" or "data looping" because the data may go round-and-round the ring system 100. Extra transmission or looping of this nature may not be desirable, in various embodiments. In one embodiment, the system 100 and the plurality of nodes may be configured to prevent looping of the data, as described above.

In one embodiment, looping may be prevented by the removal of the data by the removal node 118, as described above. In one embodiment, looping may be prevented by including nodes that are configured to determine if the tag associated with the data indicates that the present node is the wrapping node for the data. In one embodiment, the wrapping node 108 may receive the data from removal node 118. In one embodiment, the wrapping node 108 may determine that it is the "wrapping node" for the data and remove the data from the system 100.

FIG. 1b is a block diagram of a system 100b for the routing of multi-cast information in a network in accordance with the disclosed subject matter. In one embodiment, the system 100b may include a plurality of nodes 104, 106, 108, 110, 112, 114, 116, 118, 130 and 132. In one embodiment, multi-cast data may enter the system 100b via source node 104. In one embodiment, the multi-cast data may have the following destinations: destination module 119, destination module 115, and destination module 134.

In one embodiment, the source node 104 may copy the data into a first and a second data. In one embodiment, the source node 104 may send the first data to destination module 115 via preferred routing path 105b. In one embodiment, the first data may be tagged as being in a "normal" route state, or, in another embodiment, untagged, as described above. In one embodiment, the node 114 may act as a destination node for this first data. In one embodiment, the first data may be removed from the system 100b by either node 114 or, in one embodiment, the landing node 116.

In one embodiment, the source node 104 may send the second data to destinations modules 119 and 134 via the preferred routing path 105. As described above in reference to FIG. 1a, in one embodiment, a network path failure 107 may exist that prevents the delivery of the second data via preferred routing path 105. In one embodiment, the wrap node 108 may be configured to tag the data as being in a "jump" route state and transmit the second data around the network path failure 107 via the recovery routing path 109.

In one embodiment, the second data may reach the node 114. In one embodiment, the node 114 may act as a transit node for the second data. In one embodiment, the node 114 may be configured to read the tag associated with the data to determine the routing state of the data. In one embodiment, if the tag (or lack thereof) indicates that the data is in a "normal" route state, a copy of the data may be made and transmitted to the destination module 115. In one embodiment, this may result in destination module 115 receiving the data twice: first, as the first data sent via preferred routing path 105b, and a second time as the second data via the recovery routing path 109. In one embodiment, the process may also occur if the tag (or lack thereof) indicates that the data is in a "landing" route state.

However, in the illustrated embodiment, the tag associated with the second data may indicate that the data is in a "jump" route state. Therefore, the node 114 may be prevented, or may refrain, from transmitting the second data to the destination module 115. In one embodiment, the plurality of nodes may be configured to allow no more than one copy of data marked as multi-cast to be received by each module.

In one embodiment, the second data may reach the landing node 116 which may, as described above in relation to FIG. 1a, modify the tag associated with the data to indicate that the routing state of the second data is in a "landing" mode. In one embodiment, the second data may arrive at the node 132.

In one embodiment, the node 132 may be configured to read the tag associated with the data to determine the routing state of the data. As described above in relation to node 114, the node 132 may determine that the second data is now in a "landing" route state and that a multi-cast copy of the data may be made. In one embodiment, the node 132 may copy and transmit the second data to the destination module 134. In one embodiment, the node 132 may be thought of as one of two destination nodes for the second data. In one embodiment, the node 132 may forward the second data to the node 118.

In one embodiment, the node 118 may be configured to read the tag associated with the data to determine the routing state of the data. As described above, the node 118 may determine that the second data is now in a "landing" route state and that a multi-cast copy of the data may be made. In one embodiment, the node 118 may copy and transmit the second data to the destination module 119. In one embodiment, the node 118 may be thought of as one of two destination nodes for the second data. Furthermore, node 118 may determine (e.g. based upon the wrap node field of the tag associated with the second data) that it is the removal node for the second data, and remove the data from the system 100, as described above.

Figure 2:
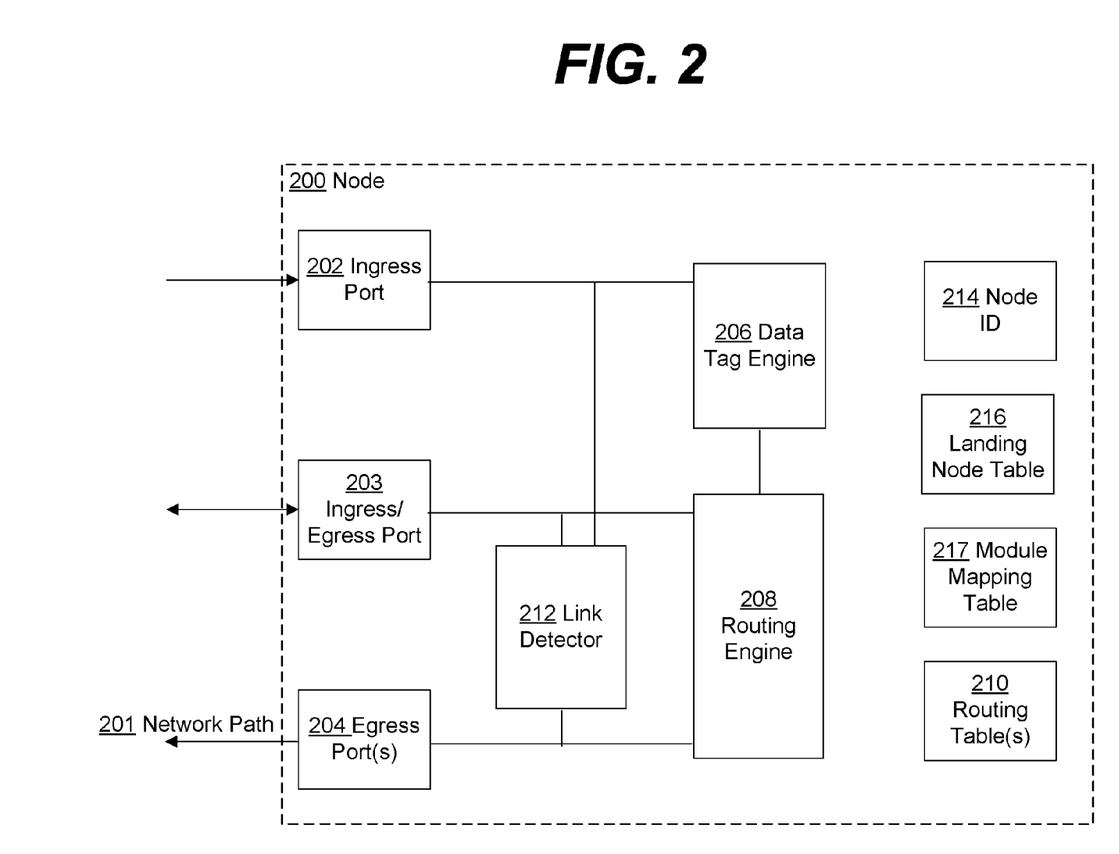
FIG. 2 is a block diagram of an apparatus for the routing of information in a network in accordance with the disclosed subject matter.

FIG. 2 is a block diagram of an apparatus for the routing of information in a network in accordance with the disclosed subject matter. In one embodiment, the apparatus may include a node 200. In one embodiment, the node may be part of a plurality of nodes such as those of system 100 or 100b of FIGS. 1a and 1b, respectively. In one embodiment, the node 200 may include an ingress port 202, a plurality of egress ports 204, a data tag engine 206, and a routine engine 208. In one embodiment, the node 200 may also include one or more of the following: a routing table 210, a link detector 212, a node identifier (ID) 214 a module mapping table 217, and/or a landing node table 216.

In one embodiment, the ingress port 202 may be configured to receive data. In one embodiment, the data may be from a module outside a system of which the node 200 is a part, or, in one embodiment, another node. In one embodiment, the egress port 204 may be configured to transmit data. In one embodiment, the data may be transmitted via a network path 201. In one embodiment, the data may be transmitted to a module outside a system of which the node 200 is a part, or, in one embodiment, another node. In one embodiment, each egress port 204 may be coupled with a different node or module and, therefore, may be coupled with different network paths 201. In one embodiment, the ingress port 202 and the egress port 204 may include each other, such as for example, ingress/egress port 203. In one embodiment, the ingress port 202 and the egress port 204 may be separate ports but substantially identical.

In one embodiment, the data tag engine 206 may be configured to read a tag, associated with the data. In one embodiment, the tag may indicate the routing state of the data. In one embodiment, the data tag engine 206 may be configured to, based at least in part upon the tag, determine whether to use a preferred routing path or a recovery routing path in order to transmit the data. In one embodiment, the path determined by the data tag engine 206 may be known as a selected path. In one embodiment, this determination may be made as described above in relation to FIG. 1. Specific instances of such determination are discussed above in relation to the source node 104, the transit nodes 106, 110, 112, and 114, and landing node 116.

In one embodiment, the selection of a network path may occur in hardware. In one embodiment, the selection may occur within the speed at which normal data travels, as opposed to the speed at which control data may travel. In one embodiment, the node 200 may send and receive control data from other nodes or devices using an average data rate lower than that of normal non-control data. In one embodiment, the control data may be sent/received using an out-of-band channel (not shown). In one embodiment, the control data may be sent via software, firmware of a combination thereof. In one embodiment, the software based control signals and any route selection utilizing them may be relatively slow (e.g. at least 100 milliseconds). Conversely, in one embodiment, the selection of a routing path based upon a hardware implemented data tag engine 206 may be relatively fast (e.g. less than 50 ms). In one embodiment, various other functions performed by the data tag engine 206 of the routing engine 208 may be performed in hardware.

In one embodiment, the data tag engine 206 may be configured to determine if the tag is to be modified to indicate a change in the routing status of the data. In one embodiment, the tag may be modified to indicate that the routing status of the data is a "normal" state, as discussed above in relation to the source node 104. In another more preferred embodiment, the absence of a tag may indicate a "normal" state. In one embodiment, the tag may be created or modified to indicate that the routing status of the data is a "jump" state, as discussed above in relation to the wrap node 108. In one embodiment, the tag may be modified to indicate that the routing status of the data is a "landing" state, as discussed above in relation to the landing node 116.

In one embodiment, the tag may include a routing status or route state field. In one embodiment, the routing status field may be configured to indicate the routing state of the data. In one embodiment, the tag may include a wrapping node field. In one embodiment, the wrapping node field may be configured to indicate which node (if any) acted as a wrapping node for the data, as discussed above in relation to FIG. 1. In one embodiment, these fields may be added to the data as the information becomes available; for example, the wrapping node field may be added only when a wrapping node is detected.

In one embodiment, data tag engine 206 may be configured to select the recovery routing path regardless of the information included in the tag, if the preferred routing path contains a broken link or network path failure. In one embodiment, the data tag engine may be configured to allow the node 200 to act as a wrapping node. In one embodiment, the node 200 may include a link detector 212. In one embodiment, the link detector 212 may be configured to detect if a network path 201 associated with an egress port 204 is functional, and if not, to mark the network path 201 as broken. In one embodiment, the link detector 212 may be implemented in hardware and performing the described functions may occur within the speed at which normal data travels, as opposed to the speed at which control data travels. In one embodiment, the data tag engine 206 and the link detector 212 may be configured to attempt to assure that data is not lost after the failure has been detected. In one embodiment, the link detector 212 and the data tag engine 206 may be configured to prevent data from "bouncing" as described above in relation to FIG. 1. In one embodiment, the link detector 212 may be configured to utilize the information included in the tag to determine the state of the network path 201, as described above in relation to node 106 of FIG. 1a.

In one embodiment, the data tag engine 206 may be configured to determine if the node is a landing node associated with the data and if the tag indicates that a recovery routing path is selected and that a multi-cast copy of the data should not be made. In one embodiment, the tag may indicate that the routing state of the data is in a "jump" mode. In one embodiment, if both conditions are met, the data tag engine 206 may be configured to modify that tag to indicate that a recovery routing path is selected and that a multi-cast copy of the data may be made. In one embodiment, the tag may be modified to indicate that the routing state of the data is in a "landing" mode. In one embodiment, the data tag engine may be configured to allow the node 200 to act as a landing node.

In one embodiment, the routing engine 208 may be configured to utilize a selected network routing path to determine which of the plurality of egress ports 204 from which to transmit the data. In one embodiment, the routing engine 208 may include a routing table 210. In one embodiment, the routing table 210 may be configured to provide, at least part of, both a preferred routing path and a recovery routing path.

In one embodiment, the routing table 210 may include a preferred or normal routing table, configured to provide at least part of a preferred routing path, and a recovery routing table configured to provide at least part of the recovery routing path. In one embodiment, the routing table 210 may include a source module field, destination module field, and an egress port field. In one embodiment, the routing table 210 may include a source module field, destination module field, a preferred routing path egress port field, and a recovery routing path egress port field. In one embodiment, the table may include an entry for each known module coupled with a system of which the node 200 is a part. In one embodiment, the tables may be updated via a software, firmware, or combination thereof.

In one embodiment, the node 200 may include a module mapping table 217. In various embodiments, the module mapping table 217 may include a mapping of modules (e.g. modules 115 and 119 of FIG. 1a, etc.) to their respective nodes (e.g. nodes 114 and 118, respectively, etc.). In various embodiments, this module mapping table 217 may be employed in conjunction with routing table 210.

In one embodiment, the routing engine 208 may match the source and destination modules associated with the data to determine the proper egress port 204 from which to transmit the data. In one embodiment, the routing engine 208 may be configured to communicate with the data tag engine 206 to select between the preferred routing path and the recovery routing path.

In one embodiment, the routing engine 208 and the data tag engine 206 may be configured to allow a module associated with an egress port to receive no more than one copy of data marked as multi-cast, as described above in relation to FIG. 1b. In one embodiment, the routing engine 208 and the data tag engine 206 may be configured to prevent the bouncing of data, as described above in relation to FIG. 1. In one embodiment, the routing engine 208 and the data tag engine 206 may be configured to prevent the looping of data, as described above in relation to FIG. 1.

In one embodiment, the node 200 may include a node identifier (ID) 214. In one embodiment, the node identifier (ID) 214 may be configured to uniquely identify the node. In one embodiment, the identification may only be unique within a system, such as for example system 100. In one embodiment, the node identifier 214 may be used by the data tag engine 206 when indicating that a node is acting a special node, such as, a wrap node.

In one embodiment, the node 200 may include a landing node table 216. In one embodiment, the landing node table 216 may be configured to indicate which node from among a plurality of nodes in a system (e.g. system 100), of which node 200 is a part, is topologically furthest away from node 200. In one embodiment, the data tag engine 206 may be configured to, if node 200 is acting as a source node, edit the tag to indicate which node is the landing node for the data. Conversely, in one embodiment where the landing node information is not included in the tag, the landing node table 216 may be used to determine if node 200 is the landing node for the data.

Figure 3:
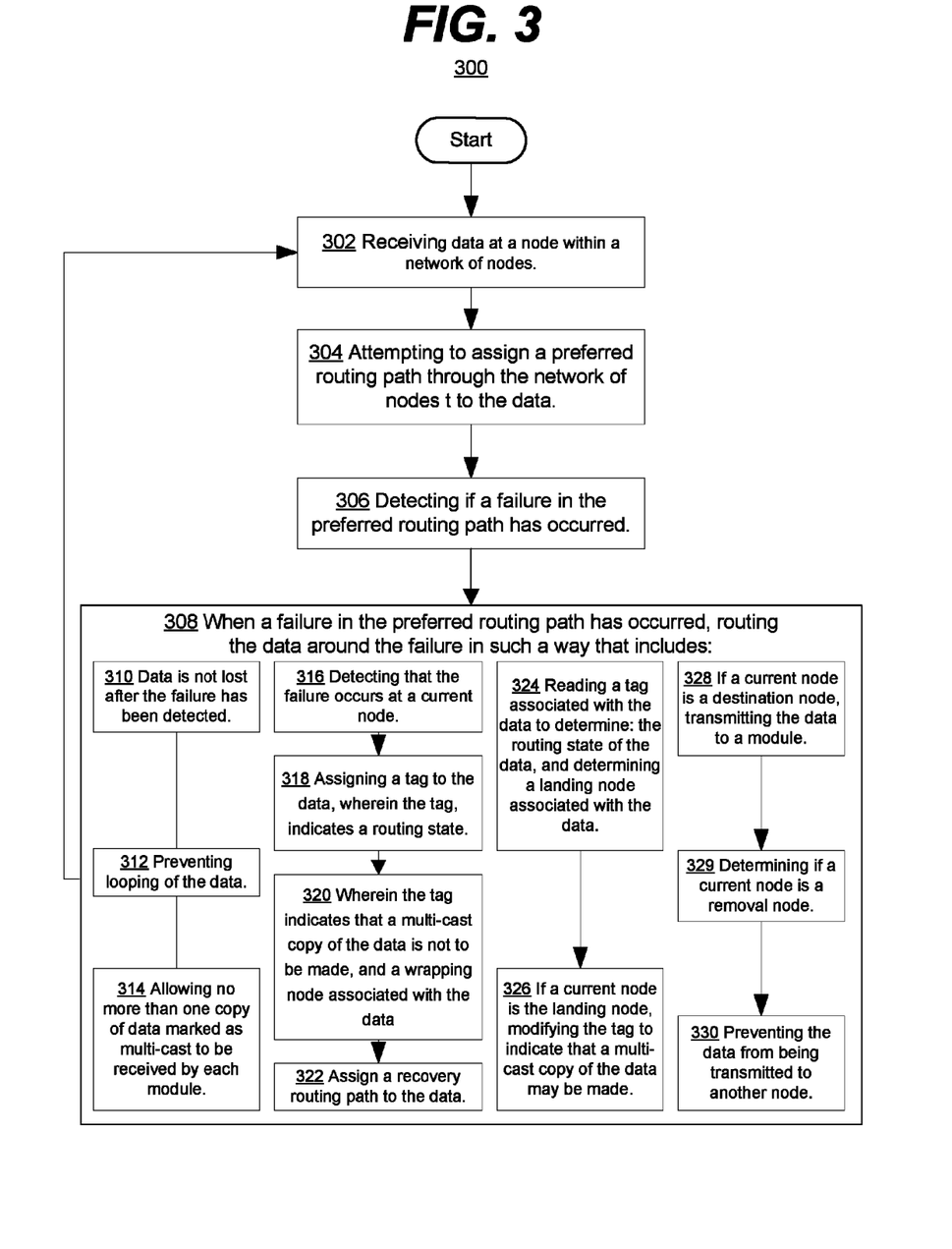
FIG. 3 is a flowchart of a technique for the routing of information in a network in accordance with the disclosed subject matter.

FIG. 3 is a flowchart of a technique 300 for the routing of information in a network in accordance with the disclosed subject matter. Block 302 illustrates that, in one embodiment, data may be received. In one embodiment, the node 200 of FIG. 2 may receive the data as described above, as discussed above.

Block 304 illustrates that, in one embodiment, a preferred routing path may be assigned to the data. In one embodiment, the source node 104 of FIGS. 1a and 1b may perform this assignment, as discussed above. In one embodiment, the data tag editor 206 of FIG. 2 may perform this assignment, as discussed above. In one embodiment, Blocks 302 and 304 may be performed by the source node 104 of FIG. 1a.

Block 306 illustrates that, in one embodiment, a failure in the preferred routing path may be detected. In one embodiment, the wrapping node 108 of FIGS. 1a and 1b may perform this detection, as discussed above. In one embodiment, the link detector 212 of FIG. 2 may perform this detection, as discussed above.

Block 308 illustrates that, in one embodiment, the data may be routed around the failure. In one embodiment, the systems 100 and 100b of FIGS. 1a, and 1b, respectively, may perform this routing, as discussed above. In one embodiment, the node 200 of FIG. 2 may perform this routing, as discussed above. In one embodiment, Blocks 302, 304, 306, and 308 may be performed by a transit node of system 100 or system 100b of FIGS. 1a and 1b, respectively.

Block 310 illustrates that, in one embodiment, the routing of Block 308 may include routing such that data is not lost after the failure has been detected. In one embodiment, data loss may be prevented by performing the routing as a hardware function, as opposed to a software function. In such an embodiment, the re-routing may occur at the speed at which normal data travels (e.g. less than 50 ms), as opposed to the speed at which software generated control data may travel (e.g. at least 100 ms). In one embodiment, the systems 100 and 100b of FIGS. 1a, and 1b, respectively, may perform this routing, as discussed above. In one embodiment, the data tag engine 206 and link detector 212 of FIG. 2 may perform this routing, as discussed above.

Block 312 illustrates that, in one embodiment, the routing of Block 308 may include routing such that the data does not loop. In one embodiment, data looping may be prevented by removing the data at a wrapping node or a removal node. In one embodiment, data looping may include data bouncing. In one embodiment, the wrapping node 108 and/or the removal node 118 of FIGS. 1a, and 1b may perform this routing, as discussed above. In one embodiment, the data tag engine 206 and/or routing engine 208 of FIG. 2 may perform this routing, as discussed above.

Block 314 illustrates that, in one embodiment, the routing of Block 308 may include routing such that no more than one copy of data that is marked as multi-cast is allowed to be received by each module. In one embodiment, this may be accomplished by utilizing a tag associated with the data that comprises a routing state wherein the routing state indicates whether or not a copy of multi-cast data may be made. In one embodiment, the routing state may include the "normal", "jump", and "landing" routing states described above. In one embodiment, the systems 100 and 100b of FIGS. 1a, and 1b, respectively, may perform this routing, as discussed above. In one embodiment, the data tag engine 206 and/or routing engine 208 of FIG. 2 may perform this routing, as discussed above.

Block 316 illustrates that, in one embodiment, routing may include detecting that the network path failure occurs at the current node. In one embodiment, the wrapping node 108 of FIG. 1a may perform this detection, as discussed above. In one embodiment, the link detector 212 of FIG. 2 may perform this routing, as discussed above.

Block 318 illustrates that, in one embodiment, routing may include assigning a tag to the data, wherein the tag, indicates a routing state. In one embodiment, the routing state may include the "normal", "jump", and "landing" routing states described above. In one embodiment, assigning a tag may include editing an existing tag. In one embodiment, the wrapping node 108 of FIG. 1a may perform this assignment, as discussed above. In one embodiment, the data tag engine 206 of FIG. 2 may perform this routing, as discussed above.

Block 320 illustrates that, in one embodiment, assigning may include assigning a tag to the data, wherein the tag can indicate that a multi-cast copy of the data is not to be made and can indicate a wrapping node associated with the data. In one embodiment, the wrapping node 108 of FIG. 1a may perform this assignment, as discussed above. In one embodiment, the data tag engine 206 of FIG. 2 may perform this routing, as discussed above.

Block 322 illustrates that, in one embodiment, the recovery routing path may be assigned to the data. In one embodiment, the wrapping node 108 of FIG. 1a may perform this assignment, as discussed above. In one embodiment, the data tag engine 206 and/or routing engine 208 of FIG. 2 may perform this routing, as assignment above. In one embodiment, the actions of Blocks 316, 318, 320, and 322 may be preformed by the wrapping node 108 of FIG. 1a, as discussed above.

Block 324 illustrates that, in one embodiment, routing may include reading a tag associated with the data to determine the routing state of the data and determining a landing node associated with the data. In one embodiment, these two pieces of information may be included in separate tags associated with the data. In another embodiment, the landing node may be derived from a source node field included in the data (e.g. as a portion of a header, etc.). In one embodiment, the landing node 116 of FIG. 1a may perform this reading, as discussed above. In one embodiment, the data tag engine 206 of FIG. 2 may perform this routing, as discussed above.

Block 326 illustrates that, in one embodiment, routing may include, if the current node is the landing node, modifying the tag to indicate that a multi-cast copy of the data may be made. In one embodiment, this modification may include altering the route state from a "jump" mode to "landing" mode. In one embodiment, Block 326 may be performed only if the routing state indicates that the data is assigned to a recovery routing path. In one embodiment, the landing node 116 of FIG. 1a may perform this reading, as discussed above. In one embodiment, the data tag engine 206 of FIG. 2 may perform this routing, as discussed above. In one embodiment, the actions of Blocks 324 and 326 may be performed by the landing node 116 of FIG. 1a, as discussed above.

Block 328 illustrates that, in one embodiment, routing may include, if the current node is a destination node, transmitting the data to a module. In one embodiment, this may include reading a tag associated with the data to determine the data's routing state. In one embodiment, the data may not be transmitted if the data is multi-cast data and the data's routing state indicates that no multi-cast copies of the data may be received by a module (e.g., the data is in a "jump" routing state). In one embodiment, the destination node 118 of FIG. 1a may perform this transmitting, as discussed above. In one embodiment, the routing engine 208 and the egress port 204 of FIG. 2 may perform this transmitting, as discussed above.

Block 329 illustrates that, in one embodiment, a determination may be made as to whether or not a node is a removal node, as described above. In various embodiments, this determination may be made with the aid of the wrapping node field of a tag associated with data, as described above. In one embodiment, if the node is a removal node the action(s) of Block 330 may be performed. In one embodiment, the removal node 118 of FIG. 1a may perform this determination, as discussed above. In one embodiment, the routing engine 208 of FIG. 2 may perform this action, as discussed above.

Block 330 illustrates that, in one embodiment, routing may include preventing the data from being transmitted to another node. In one embodiment, this may prevent the looping or, in one embodiment, the bouncing of data. In one embodiment, the removal node 118 of FIG. 1a may perform this preventing, as discussed above. In one embodiment, the removal node 118 or wrapping node 108 of FIG. 1a may perform this preventing, as discussed above. In one embodiment, the data tag engine 206 and/or the routing engine 208 of FIG. 2 may perform this preventing, as discussed above.

Figure 4:
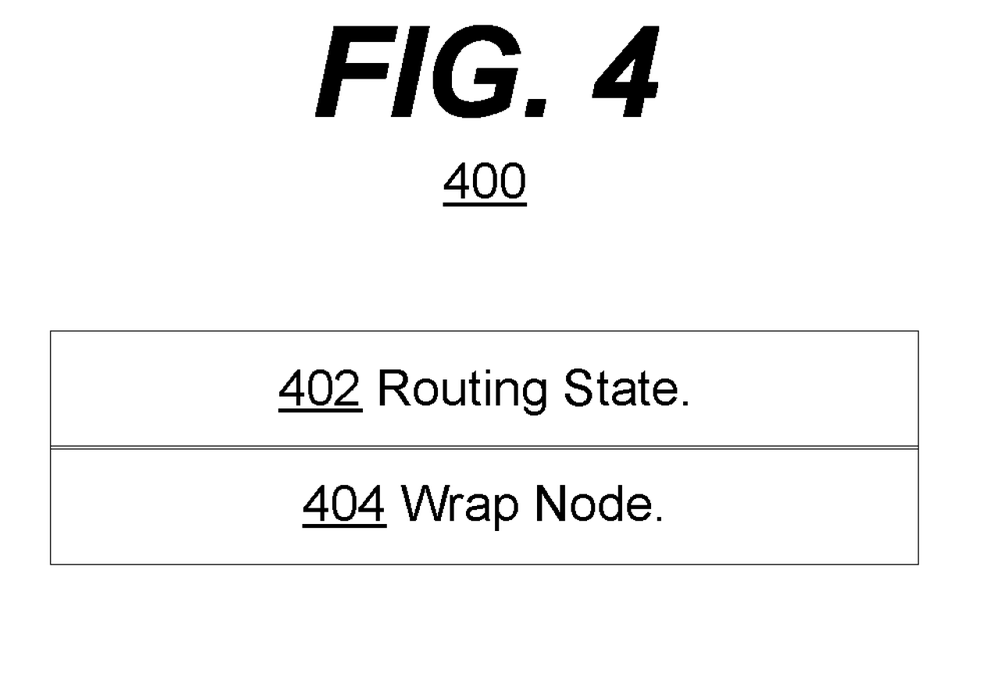
FIG. 4 is a block diagram of a tag for the routing of information in a network in accordance with the disclosed subject matter.

FIG. 4 is a block diagram of a tag 400 for the routing of information in a network in accordance with the disclosed subject matter. In one embodiment, the tag 400 may include a routing state field 402 configured to that indicate the routing state of the data. In some embodiments, the tag 400 may include a wrap node field 404 configured to indicate the wrap node associated with the data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g. in a machine-readable storage device or in a propagated signal, for execution by, or to control the operation of, data processing apparatus, e.g. a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g. an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g. internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a variety of components. Components may be interconnected by any form or medium of digital data communication, e.g. a communication network. Examples of communication networks include a local area network (LAN) and a wide area network (WAN), e.g. the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A node comprising:
   a routing table configured to provide, at least part of, both a preferred routing path and a recovery routing path;
   a data tag engine configured to:
     read a tag, included by a received data, that indicates the routing state of the data and includes a wrap node field,
     determine, based at least in part upon the tag, whether to use the preferred routing path or the recovery routing path for a selected path, and
     determine if the tag is to be modified to indicate a change in the routing state of the data; and
   a routing engine configured to utilize the selected path to determine an egress port from which to transmit the data and the tag.

2. The node of claim 1 wherein the data tag engine is configured to modify the tag to indicate a state comprised of one of the following:
   a state in which a preferred routing path is selected;
   a state in which a recovery routing path is selected and that a multi-cast copy of the data should not be made; and
   a state in which a recovery routing path is selected and that a multi-cast copy of the data may be made.

3. The node of claim 1 further comprising a link detector configured to detect if a network path associated with an egress port is functional, and if not, to indicate that the network path as broken; and
   wherein the data tag engine is configured to:
     if the preferred routing path would use the broken network path, determine that the recovery routing path should be the selected path, and
     modify the tag to indicate that a recovery routing path is selected and that a multi-cast copy of the data may be made.

4. The node of claim 1 further comprising a node identifier configured to uniquely identify the node; and
   wherein the routing engine is further configured to delete any data whose tag indicates that the routing state of the data is a routing state in which a recovery routing path is selected and that a multi-cast copy of the data may be made, and
   that the data has previously been received by the node.

5. The node of claim 1 further comprising a landing node table configured to indicate which node from among a plurality of nodes operably connected to the node of claim 1 is topologically furthest away from the node of claim 1.

6. The node of claim 1 wherein the data tag engine is further configured to:
   determine if the node is a landing node associated with the data and if the tag indicates that a recovery routing path is selected and that a multi-cast copy of the data should not be made, and
   if both conditions are met, to modify that tag to indicate that a recovery routing path is selected and that a multi-cast copy of the data may be made.

7. The node of claim 1 wherein the routing engine and data tag engine are configured to prevent looping of the data.

8. The node of claim 1 wherein a time to switch between the preferred routing path and recovery routing path is less than about 50 milliseconds.

9. The node of claim 1 wherein the routing engine and data tag engine are configured to allow a module associated with an egress port to receive no more than one copy of data marked as multi-cast.

10. A system coupled with a plurality of modules, and comprising:
    a plurality of nodes arranged in a ring topology, wherein the plurality of nodes are configured to:
    detect a network path failure between two nodes,
    reroute data around the network path failure employing a tag that indicates one of at least three routing states, includes a wrap node field, and is transmitted with the data,
    prevent looping of the data, and
    allow no more than one copy of data marked as multi-cast to be received by each module.

11. The system of claim 10 wherein each node comprises:
    an ingress port configured to receive data;
    a plurality of egress ports configured to transmit data;
    a routing table configured to provide, at least parts of, both a preferred routing path and a recovery routing path;
    a data tag engine configured to:
    read the tag transmitted with the data that indicates the routing state of the data and, based at least in part upon the tag determine whether to use either the preferred routing path or the recovery routing path for a selected path, and
    determine if the tag is to be modified to indicate a change in the routing state of the data; and a routing engine configured to utilize the selected path to determine the egress port from which to transmit the data.

12. The system of claim 10 wherein the plurality of nodes is further configured to, when data enters the system at a source node, the data having a destination module:
transmit the data to a destination node coupled with the destination module via a preferred routing path.

13. The system of claim 12 wherein the plurality of nodes is further configured to, if a network path failure is detected along the preferred routing path:
add the tag to the data indicating that:
a recovery routing path is selected and that a multi-cast copy of the data should not be made, and
an identity of a node topologically just prior, along the preferred routing path, to the network path failure; and
transmit the data to a removal node via the recovery routing path.

14. The system of claim 12 wherein the plurality of nodes is further configured to, when the data is received by a landing node, add a tag to the data indicating that a multi-cast copy of the data may be made.

15. The system of claim 12 wherein the plurality of nodes is further configured to, when the data is received a second time by a wrapping node, remove the data from the system.

16. The system of claim 13 wherein the plurality of nodes is further configured to, when the data is received by the removal node, remove the data from the system.

17. A method comprising:
receiving data at a node within a network of nodes;
attempting to assign a preferred routing path through the network of nodes to the data;
detecting if a failure in the preferred routing path has occurred; and
when a failure in the preferred routing path has occurred, routing the data around the failure, by employing a tag that indicates one of at least three routing states, includes a wrap node field, and is transmitted with the data, in such a way that:
data is not lost after the failure has been detected, and
the data does not loop, and
no more than one copy of that is data marked as multi-cast is allowed to be received by each module.

18. The method of claim 17 wherein routing the data around the failure comprises:
detecting that the failure occurs at a current node;
assigning the tag to the data, wherein the assigned tag indicates a routing state,
wherein the tag indicates that a multi-cast copy of the data is not to be made, and a wrapping node associated with the data; and
assigning a recovery routing path to the data.

19. The method of claim 17 wherein routing the data around the failure comprises:
reading a tag associated with the data to determine the routing state of the data;
determining a landing node associated with the data; and
when a current node is the landing node, modifying the tag to indicate that a multi-cast copy of the data may be made.

20. The method of claim 17 wherein routing the data around the failure comprises:
when a current node is a removal node, transmitting the data to a module; and
preventing the data from being transmitted to another node.

21. A node comprising:
an ingress port configured to receive data;
a plurality of egress ports configured to transmit data and a tag associated with the data;
a node identifier configured to uniquely identify the node;
a routing table configured to provide, at least part of, both a preferred routing path and a recovery routing path;
a data tag engine configured to:
read the tag-that indicates the routing state of the data,
determine, based at least in part upon the tag, whether to use the preferred routing path or the recovery routing path for a selected path, and
determine if the tag is to be modified to indicate a change in the routing state of the data; and
a routing engine configured to:
utilize the selected path to determine the egress port from which to transmit the data and the tag, and
delete any data whose tag indicates that:
the routing state of the data is a routing status in which a recovery routing path is selected and that a multi-cast copy of the data may be made, and
that the data has previously been received by the node.

* * * * *

UNITED STATES PATENT AND TRADEMARK OFFICE
CERTIFICATE OF CORRECTION

PATENT NO. : 8,248,918 B2
APPLICATION NO. : 12/371205
DATED : August 21, 2012
INVENTOR(S) : Jin Ding et al.

It is certified that error appears in the above-identified patent and that said Letters Patent is hereby corrected as shown below:

In column 15, line 43, in claim 17, delete "that is data marked" and insert -- that data is marked --, therefor.

In column 16, line 30, in claim 21, delete "tag-that" and insert -- tag that --, therefor.

Signed and Sealed this
Fifteenth Day of January, 2013

David J. Kappos
*Director of the United States Patent and Trademark Office*